Figures 1, 2:
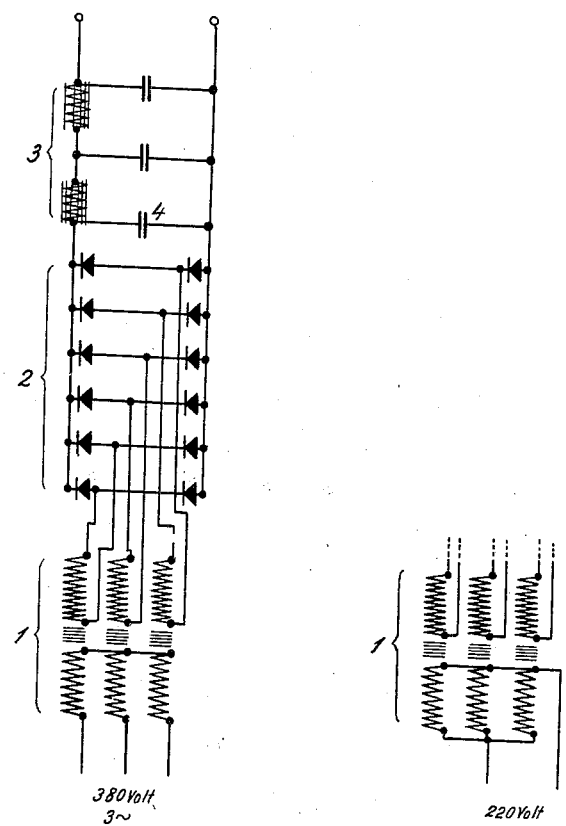

Patented Aug. 6, 1940

2,210,667

UNITED STATES PATENT OFFICE 2,210,667

ARRANGEMENT FOR FEEDING RADIO TRANSMITTERS AND THE LIKE

Rudolf Hinkelmann, Berlin-Tempelhof, Germany, assignor to C. Lorenz Aktiengesellschaft, Berlin-Tempelhof, Germany, a company Application December 17, 1937, Serial No. 180,400½. In Germany October 21, 1936

2 Claims. (Cl. 175—363)

The present invention relates to arrangements for obtaining a constant direct current voltage from different alternating main supplies.

It is frequently desirable in connection with non-stationary systems, for instance transmitter stations and the like, to render such systems independent of their own power source and to enable their connection to a foreign main supply. An embodiment of the present invention which is hereinafter described, assumes the foreign main supply to be a three-phase current line, while the power source associated with the system under consideration is a single-phase alternating current generator.

The object of the present invention is to provide means which will enable the existing equipment of such a system, e. g. transformers, rectifiers and the like which generally are adapted to operate with a single-phase alternating current, to be used also when the system is fed from a three-phase current main supply.

According to one feature of the invention, the above mentioned rectifying means may optionally be connected either to a three-phase current supply, or to a single-phase alternating current generator, whereby the entire means employed in single-phase operation may be used also in connection with three-phase operation. A change from the latter type of supply to a single-phase operation is performed according to the invention merely by short-circuiting the three input terminals of the system.

The invention will be more readily understood from the following description in conjunction with the attached drawing, in which Fig. 1 diagrammatically demonstrates an arrangement according to the invention for use in connection with a three-phase current supply, while Fig. 2 is a diagrammatical illustration of a similar arrangement as shown in Fig. 1, but adapted for single-phase alternating current operation.

The arrangement shown in Fig. 1, employing a three-phase current supply, comprises a transformer device 1 having three separate single-phase transformers, rectifying means 2 and smoothing means 3. The primary windings of said separate transformers are preferably associated in a star-connection. Each secondary winding of the last mentioned transformers is connected to the input side of a rectifying device of the Graetz-circuit type, while the output side of each rectifying device is terminated in a parallel two-wire line leading to the smoothening means or filter assembly 3.

In the arrangement according to Fig. 2, which is intended to operate with a single phase alternating current supply, the three input terminals of the primary transformer windings are short-circuited, and the alternating current is applied to a member bridging said terminals and to the center point of the star. The voltage at the secondary side is thereby the same in both cases concerned, provided that the relation $\sqrt{3}:1$ exists between the interlinked three-phase voltage and the single-phase alternating voltage. A condenser 4 in front of the filter assembly 3 is of particular importance. Said condenser presents such a value that it imparts a very slight or no contribution to the voltage smoothing on applying a three-phase current, while on feeding the system with a single-phase alternating current, in which case the harmonics have considerable values, said condenser acts to smooth the alternating current so as to provide substantially equal operating conditions at the filtering device behind said condenser whether the system is supplied with a three-phase current or with a single-phase alternating current.

Furthermore, said condenser also serves to increase the voltage since it is charged at the peaks of the alternating voltage. This fact permits an operation at the same alternating voltage in front of the system whether the latter is fed by a single phase alternating current or a three-phase current.

The invention is by no means limited to the above described embodiment which is given merely by way of an example, but is applicable to all systems or devices in which a constant direct current voltage output is desired to be obtained from different alternating current supplying systems.

What is claimed is:

1. An arrangement for obtaining a constant direct current voltage output from different alternating current sources of single phase and three phase power respectively, which comprises a two-wire line, smoothing means connected in said line, three separate rectifying networks having three separate inputs and having three outputs all connected in parallel to said line, three separate single phase transformers each having a primary and a secondary, permanent connections between said secondaries and the inputs of said rectifying networks separately connecting each such secondary to one such input, and variable connections to the primaries of said transformers for connecting these alternatively to said single phase or said three phase source.

2. An arrangement according to claim 1, wherein said smoothing means comprises a condenser connected across said two-wire line adjacent the shunt connected outputs of said rectifying networks.

RUDOLF HINKELMANN.